(12) United States Patent
Hodgman et al.

(10) Patent No.: US 9,015,231 B1
(45) Date of Patent: Apr. 21, 2015

(54) DISTRIBUTED ANONYMIZED COMMUNICATIONS

(75) Inventors: Roy Hodgman, Wenham, MA (US); Marten Erik van Dijk, Somerville, MA (US); Eyal Kolman, Tel Aviv (IL)

(73) Assignee: EMC Corporation, Hopkinton, MA (US)

( * ) Notice: Subject to any disclaimer, the term of this patent is extended or adjusted under 35 U.S.C. 154(b) by 490 days.

(21) Appl. No.: 13/431,231

(22) Filed: Mar. 27, 2012

(51) Int. Cl.
*G06F 15/16* (2006.01)
*H04W 12/08* (2009.01)
*H04W 12/02* (2009.01)

(52) U.S. Cl.
CPC .............. *H04W 12/08* (2013.01); *H04W 12/02* (2013.01)

(58) Field of Classification Search
CPC ... H04L 41/0983; H04W 12/08; H04W 12/02
See application file for complete search history.

(56) References Cited

U.S. PATENT DOCUMENTS

| | | | |
|---|---|---|---|
| 2003/0041101 A1* | 2/2003 | Hansche et al. | 709/203 |
| 2006/0036693 A1* | 2/2006 | Hulten et al. | 709/206 |
| 2007/0038418 A1* | 2/2007 | Ahn et al. | 703/2 |
| 2007/0274489 A1* | 11/2007 | Yamamura et al. | 379/201.1 |
| 2010/0162402 A1* | 6/2010 | Rachlin et al. | 726/26 |
| 2011/0033124 A1* | 2/2011 | Kuno | 382/233 |
| 2011/0173699 A1* | 7/2011 | Figlin et al. | 726/23 |

OTHER PUBLICATIONS

R.L. Rivest et al., "How to Leak a Secret," Proceedings of the 7th International Conference on the Theory and Application of Cryptology and Information Security: Advances in Cryptology—ASIACRYPT, Lecture Notes in Computer Science (LNCS), Dec. 2001, pp. 552-565, vol. 2248, Gold Coast, Australia.
U.S. Appl. No. 12/982,288, filed in the name of J.P. Field et al. Dec. 30, 2010 and entitled "Distributed Security Information and Event Management System with Application-Injected Remote Components."

* cited by examiner

*Primary Examiner* — Brian J Gillis
*Assistant Examiner* — Michael A Keller
(74) *Attorney, Agent, or Firm* — Ryan, Mason & Lewis, LLP

(57) ABSTRACT

A server is configured to communicate with a group of clients over a network. Each of the clients obtains a corresponding informational message comprising security-related information such as an indication of compromise (IOC), inserts noise in the information message to generate an anonymized message, and communicates the anonymized message to the server. The anonymized messages communicated by the respective clients to the server may be configured so as to prevent the server from identifying any individual client associated with a particular one of the anonymized messages, while also allowing the server to extract from the anonymized messages collectively one or more characteristics of the underlying informational messages. A given client may insert noise in an informational message by, for example, selecting a noise value from a specified range of noise values, and combining the informational message and the selected noise value to generate the anonymized message.

23 Claims, 3 Drawing Sheets

DISTRIBUTED ANONYMIZED COMMUNICATIONS

FIELD

Illustrative embodiments of the invention relate generally to the field of communication systems, and more particularly to techniques for distributed anonymous communication in such systems.

BACKGROUND

A variety of different techniques are known for ensuring anonymous communications from multiple members of a privacy-preserving group. For example, in a cryptographic construct known as a ring signature, a signature is produced by one member in a set or "ring" of possible signers without revealing to the verifier which member actually produced the signature. More specifically, a ring signature allows a user to choose any set of possible signers that includes himself, and to sign a message by using his secret key and the public keys of the other members of the set, without getting their approval or assistance. A ring signature is therefore distinct from a standard group signature, in that a group signature generally requires the prior cooperation of the members of the set and also leaves each member vulnerable to later identification by a group manager.

Unlike group signatures, ring signatures have no group managers, no setup procedures, no revocation procedures, and no coordination among the members. The verifier only needs to know the public keys of the ring members in order to verify the ring signature. Furthermore, ring signatures can be constructed using simple computations, e.g., AES-Hash computations combined with a trap-door permutation such as RSA encryption. For additional details, see Ronald L. Rivest, Adi Shamir and Yael Tauman, "How to Leak a Secret," Proceedings of the 7th International Conference on the Theory and Application of Cryptology and Information Security: Advances In Cryptology, pp. 554-567, Springer-Verlag, June 2001, which is incorporated by reference herein.

As indicated above, ring signatures are privacy-preserving constructs, in that neither the verifier nor any other entity reading the ring signature can determine which member of the set of possible signers actually signed the message. However, there remains a need for improvements in privacy management relating to anonymous feedback to a central entity from a group of related reporting entities, particularly in the context of security-related information such as indications of compromise (IOCs).

SUMMARY

Illustrative embodiments of the invention provide techniques for distributed anonymized communications between a group of clients and a central server in a communication system. Such arrangements are particularly well-suited for the anonymous communication of security-related information.

In one embodiment, a server is configured to communicate with a group of clients over a network. Each of the clients generates or otherwise obtains a corresponding informational message comprising security-related information such as an IOC, inserts noise in the information message to generate an anonymized message, and communicates the anonymized message to the server. The anonymized messages communicated by the respective clients to the server may be configured so as to prevent the server from identifying any individual client associated with a particular one of the anonymized messages, while also allowing the server to extract from the anonymized messages collectively one or more characteristics of the underlying informational messages.

A given client may insert noise in an informational message by, for example, selecting a noise value from a specified range of noise values, and combining the informational message and the selected noise value to generate the anonymized message. The anonymized message in such an arrangement may be indistinguishable from a random number. Numerous other noise insertion techniques may be used in generating anonymized messages of the type disclosed herein.

One or more of the illustrative embodiments provide improved performance relative to conventional practice. For example, such embodiments can provide enhanced group feedback of IOCs or other types of security-related information without requiring the use of ring signatures or similar cryptographic constructs.

DETAILED DESCRIPTION

Illustrative embodiments of the present invention will be described herein with reference to exemplary communication systems and associated servers, clients and other processing devices. It is to be appreciated, however, that the invention is not restricted to use with the particular illustrative system and device configurations shown. Accordingly, the term "communication system" as used herein is intended to be broadly construed, so as to encompass, for example, systems in which multiple processing devices communicate with one another but not necessarily in a manner characterized by a client-server model.

Figure 1:
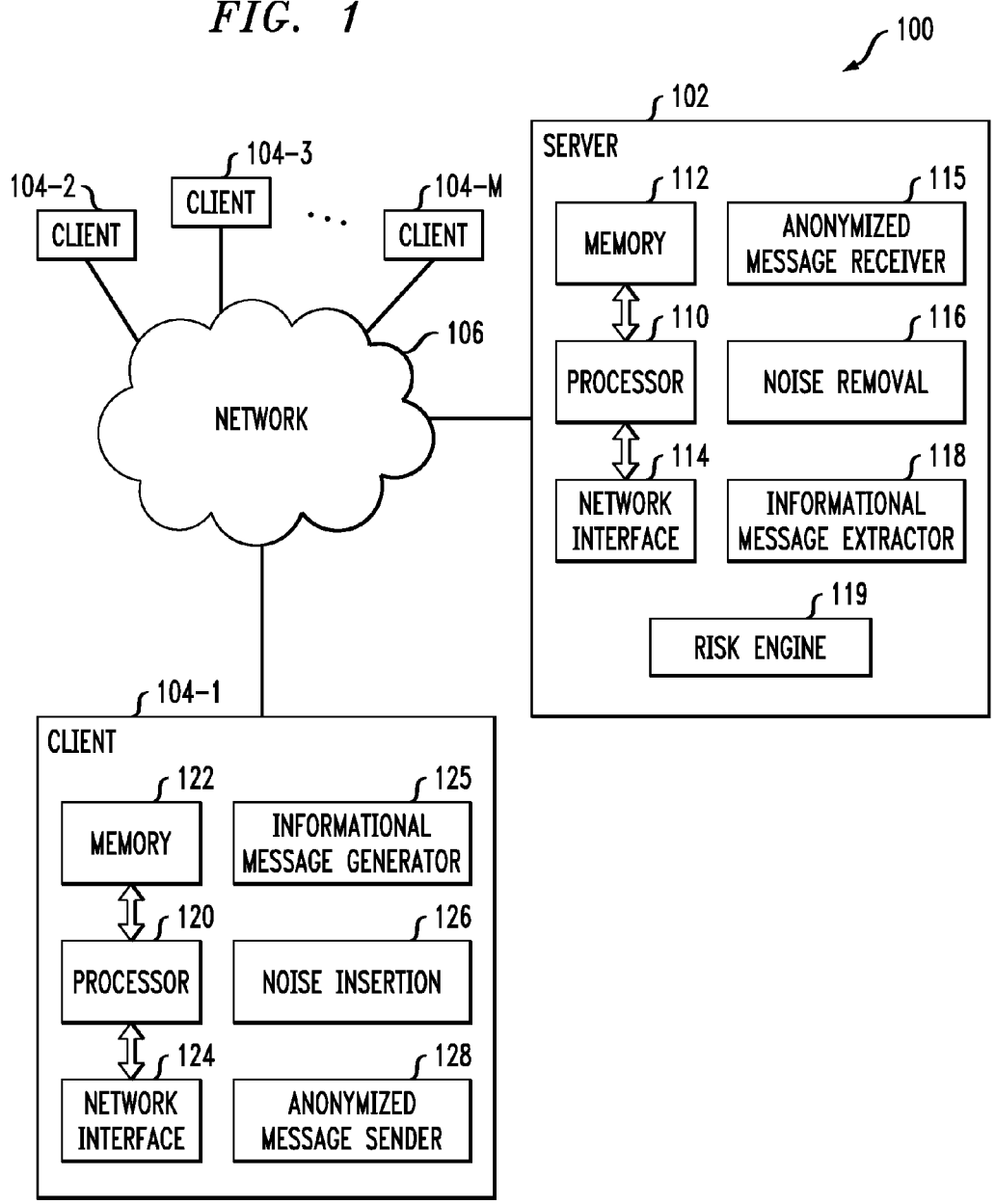
FIG. 1 is a block diagram of a communication system that incorporates functionality for distributed anonymized communications in an illustrative embodiment of the invention.

FIG. 1 shows a communication system 100 that incorporates distributed anonymized communication functionality in an illustrative embodiment. The system 100 comprises a server 102 that is configured to communicate with a plurality of clients 104-1, 104-2, . . . 104-M, over a network 106.

The server 102 and clients 104 may be implemented as respective processing devices. A given such processing device may comprise, for example, a computer, a mobile telephone or other type of communication device. Each such processing device generally comprises at least one processor and an associated memory, and implements one or more functional modules for controlling certain features of the system 100.

The system 100 in the present embodiment implements one or more processes for distributed anonymized communication. Examples of such processes will be described in conjunction with FIGS. 2, 3 and 4, but it is to be appreciated that numerous other types of processes may be used in other embodiments.

In some embodiments, the group of M clients may be viewed as comprising a privacy-preserving group, in that each client in the group can generate a corresponding anonymized message and transmit that message to the server, but the server cannot determine which of the clients in the group generated the anonymized message. In such an arrangement, each client may further incorporate additional anonymization functionality that prevents a given message from being traced back to a particular client. However, this is not a requirement of the invention, and in some embodiments the server may be able to determine which client sent a given anonymized message, even though the server cannot determine the underlying informational message. Thus, the term "anonymized message" as used herein is intended to be broadly construed so as to encompass a message that is processed so as to obscure a corresponding informational message but is otherwise traceable to a particular client.

As will be described in greater detail below, the distributed anonymized communication disclosed herein is particularly well-suited for transmitting anonymous feedback such as IOCs or other types of security-related information to a central entity.

The server 102 in the present embodiment comprises a processor 110 coupled to a memory 112. The processor 110 may comprise a microprocessor, a microcontroller, an application-specific integrated circuit (ASIC), a field-programmable gate array (FPGA) or other type of processing circuitry, as well as portions or combinations of such circuitry elements, and the memory 112, which may comprise random access memory (RAM), read-only memory (ROM) or other types of memory, in any combination.

The memory 112 and other memories disclosed herein may be viewed as examples of what are more generally referred to as "computer program products" storing executable computer program code.

Also included in the server 102 is network interface circuitry 114. The network interface circuitry 114 allows the server 102 to communicate over the network 106 with the clients 104, and may comprise one or more conventional transceivers.

The server 102 further includes an anonymized message receiver 115, a noise removal module 116, an informational message extractor 118, and a risk engine 119. One or more of these modules 115, 116, 118 and 119 may be implemented at least in part in the form of software that is stored in memory 112 and executed by processor 110.

The risk engine 119 processes feedback from the clients 104, and may perform operations such as correlation and analytics. Thus, for example, IOCs or other security-related information extracted by the server from received anonymized messages may be provided to the risk engine 119 for processing.

The risk engine 119 may also receive information from other sources. For example, the risk engine may receive information from a security information and event management (SIEM) system, such as that described in U.S. patent application Ser. No. 12/982,288, filed Dec. 30, 2010 and entitled "Distributed Security Information and Event Management System with Application-Injected Remote Components," which is commonly assigned herewith and incorporated by reference herein. An example of a commercially available centralized SIEM system is the enVision® platform commercially available from RSA, The Security Division of EMC Corporation.

A given one of the clients 104-1 in the present embodiment comprises a processor 120 coupled to a memory 122. The processor 120, like processor 110 in server 102, may comprise a microprocessor, a microcontroller, an ASIC, an FPGA or other type of processing circuitry, as well as portions or combinations of such circuitry elements, and the memory 122 may comprise RAM, ROM or other types of memory, in any combination.

Also included in the client 104-1 is network interface circuitry 124. The network interface circuitry 124 allows the client 104-1 to communicate over the network 106 with the server 102 and with the other clients 104, and may comprise one or more conventional transceivers.

The client 104-1 further includes an informational message generator 125, a noise insertion module 126 and an anonymized message sender 128. One or more of these modules 125, 126 and 128 may be implemented at least in part in the form of software that is stored in memory 122 and executed by processor 120.

The other clients 104 of the system 100 are assumed to be configured in a manner similar to that shown for client 104-1 in the figure.

The network 106 may comprise, for example, a wide area network (WAN), a local area network (LAN), a satellite network, a telephone or cable network, or various portions or combinations of these and other types of networks.

It is to be appreciated that the particular set of elements shown in FIG. 1 for providing distributed anonymized communication for a group of message-sending clients is presented by way of example, and in other embodiments additional or alternative elements may be used. Thus, another embodiment may include additional instances of server 102, network 106 or set of clients 104. In addition, the functionalities associated with separate elements in the FIG. 1 embodiment, such as elements 115, 116 and 118 in server 102 or elements 125, 126 and 128 of client 104-1, may be combined into a lesser number of elements each of which performs multiple functions.

As noted above, various elements of system 100 such as clients, servers or their associated functional modules may be implemented at least in part in the form of software. Such software is stored and executed utilizing respective memory and processor elements of at least one processing device. Accordingly, the system 100 may include additional or alternative processing platforms, as well as numerous distinct processing platforms in any combination, with each such platform comprising one or more computers, servers, storage devices or other processing devices.

Such processing platforms may include cloud infrastructure comprising virtual machines (VMs) and one or more associated hypervisors. An example of a commercially available hypervisor platform that may be used to implement portions of the communication system 100 is the VMware® vSphere™ which may have an associated virtual infrastructure management system such as the VMware® vCenter™. The underlying physical machines may comprise one or more distributed processing platforms that include storage products, such as VNX and Symmetrix VMAX, both commercially available from EMC Corporation of Hopkinton, Mass. A variety of other storage products may be utilized to implement at least a portion of the system 100.

Figure 2:
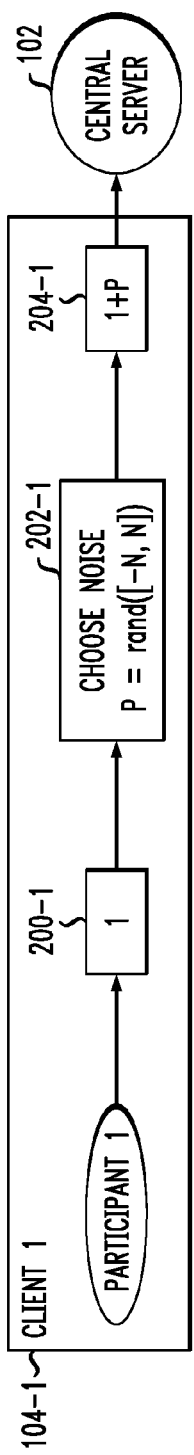
FIGS. 2 and 3 illustrate one possible manner in which a single client and a group of clients, respectively, can add random noise to messages communicated to a central server in the FIG. 1 system.
Figure 3:
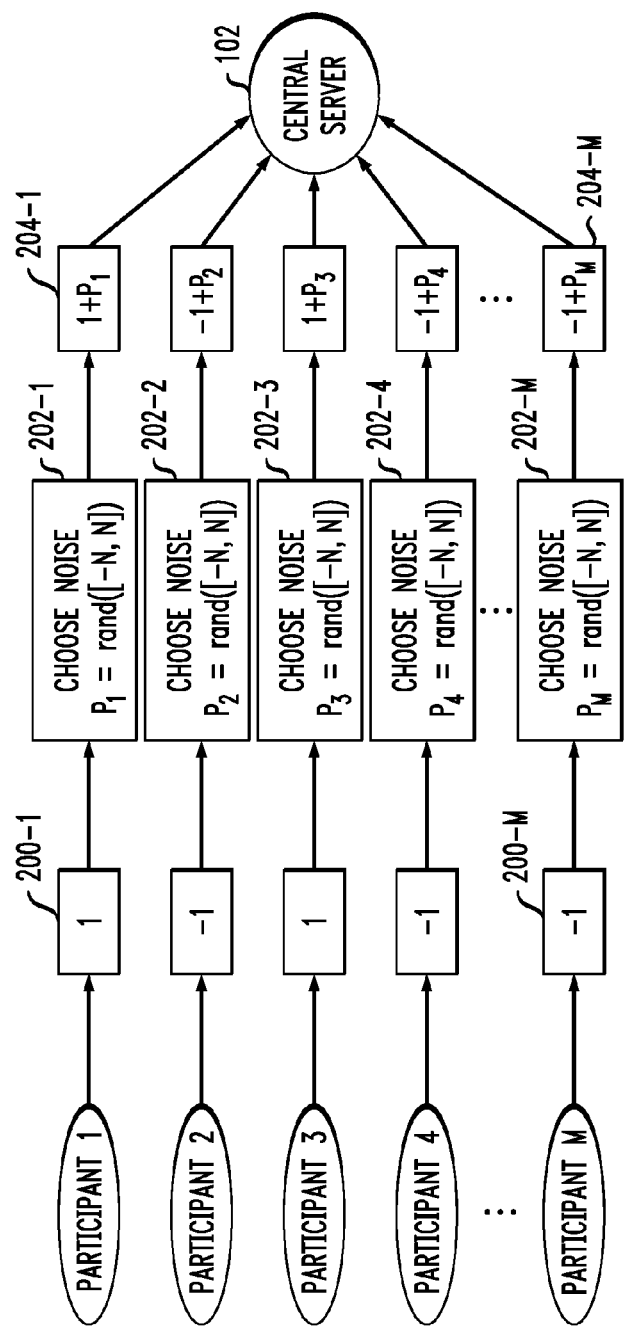
Figure 4:
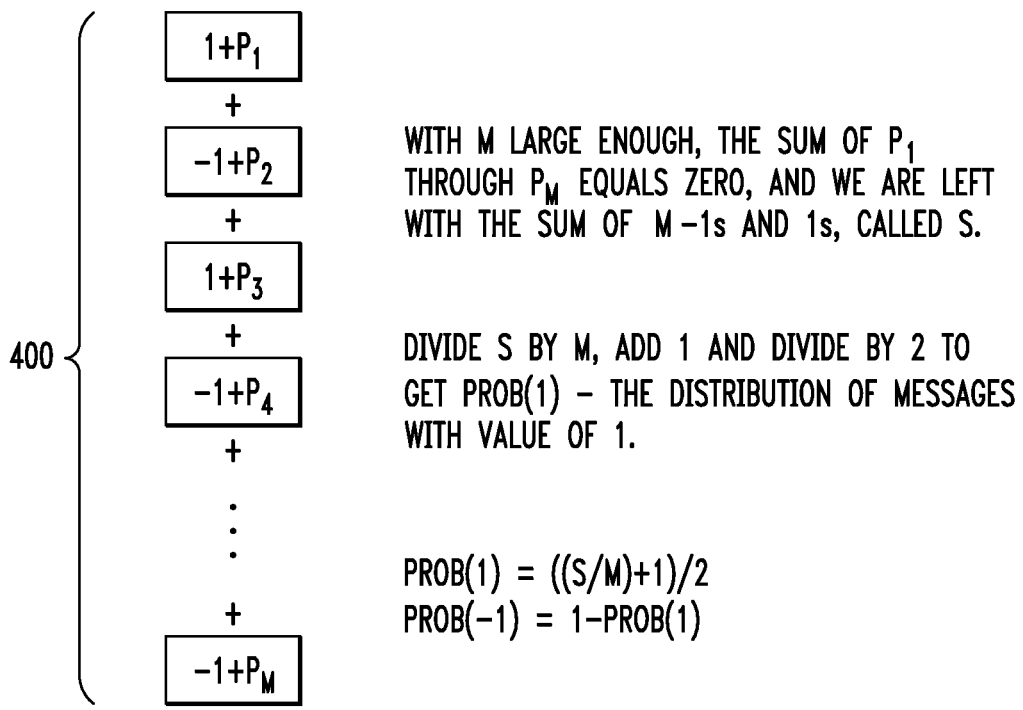
FIG. 4 shows a set of messages as received at the central server from the clients with random noise added as in FIGS. 2 and 3, and a process by which the central server can extract anonymized information from the received messages.

The operation of the communication system 100 will now be described in greater detail with reference to the diagrams of FIGS. 2, 3 and 4. FIGS. 2 and 3 illustrate anonymized message generation by a single client 104-1 and a set of multiple clients 104, respectively, and FIG. 4 illustrates the manner in which multiple received anonymized messages may be collectively processed by the server 102.

Referring initially to FIG. 2, client 104-1, also denoted as Client 1, is associated with a particular participant in group of clients 104. The participant is denoted Participant 1. The informational message generator 125 associated with client 104-1 generates an informational message 200-1. It is assumed for purposes of this embodiment that the informational message comprises a selected integer value of either 1 or −1. As illustrated in the figure, the selected integer value for message 200-1 is 1.

The noise insertion module 126 of client 104-1 is configured to select a noise value from a specified range of noise values in operation 202-1, and to combine the informational message and the selected noise value in operation 204-1 to generate the anonymized message for transmission to server 102 by anonymized message sender 128.

In this embodiment, the selected noise value comprises an integer value P that is randomly selected from a specified range given by [−N, N], where the number of clients M is much greater than N. The use of this integer range is presented by way of example only, and in other embodiments other types of symmetric distributions of values may be used for selection of noise values.

The specified range of noise values is generally configured such that noise values in the anonymized messages from the respective clients 104 substantially cancel one another out when the anonymized messages are combined by the server 102, thereby allowing the server to extract from the combined anonymized messages one or more characteristics of the informational messages.

A given one of the anonymized messages appears to be a noise value randomly selected from the specified range, and thus does not reveal its corresponding informational message. Accordingly, the anonymized message in such an arrangement may be indistinguishable from a random number. The anonymized messages therefore allow the clients 104 to provide feedback to the server 102 without allowing the server or an attacker with access to the anonymized message to determine exactly what feedback has been provided by a particular client. The server obtains the feedback by aggregating the anonymized messages to extract characteristics of the underlying informational messages.

To summarize, in the FIG. 2 embodiment, client 104-1 generates an informational message of value −1 or 1, adds a noise value P selected randomly from the range [−N,N], and sends an anonymized message comprising the sum of the informational message and the noise value P to the server 102. As indicated previously, other types of symmetric distributions may be used in place of the range [−N,N] used in this embodiment.

The same anonymized message generation process shown in FIG. 2 is repeated by each of the clients 104, in the manner illustrated in FIG. 3. As shown in this latter diagram, clients 104-1 through 104-M associated with respective Participants 1 through M generate respective informational messages 200-1 through 200-M, randomly select respective noise values $P_1$ through $P_M$ from range [−N,N] in operations 202-1 through 202-M, and combine the informational messages and selected noise values in operations 204-1 through 204-M to generate respective anonymized messages for delivery to the server 102.

As is apparent from the figure, some of the clients generate informational messages of value −1 and others generate informational messages of value 1. These messages may correspond, for example, to respective IOCs.

FIG. 4 illustrates the manner in which the received anonymized messages are processed by the server 102. The server receives a set 400 of M anonymized messages in message receiver 115 that correspond to the respective anonymized messages 204-1 through 204-M generated by the clients 104-1 through 104-M in FIG. 3. The server processes the received anonymized messages collectively in noise removal module 116 and informational message extractor 118 in order to extract one or more characteristics of the associated informational messages. More particularly, the server 102 combines the anonymized messages in noise removal module 116 such that the noise values $P_1$ through $P_M$ utilized to generate the respective anonymized messages substantially cancel one another out, and then further processes the result in informational message extractor 118.

Accordingly, as indicated in the figure, the sum of the noise values $P_1$ through $P_M$ for sufficiently large values of M is approximately zero, due to the law of large numbers, and thus combining the anonymized messages in the noise removal module 116 of server 102 leaves the sum of the M informational message values. This sum is designated as S.

The informational message extractor 118 of server 102 then divides the sum S by M, adds 1 and divides by 2 to obtain Prob(1), which denotes the probability distribution of informational messages with value 1. As there are only two potential informational message values in this example, the probability distribution Prob(−1) of informational messages with value −1 is given by Prob(−1)=1−Prob(1).

The value N should be chosen in such a way that it can sufficiently protect the intended message, and yet can be removed once all messages have been collected. Parameters such as N, M, number of expected messages, rate of messages, etc. can be selected to satisfy the particular requirements of a given application.

Also, the system can be configured to allow the server to add or remove particular clients from the aggregate feedback.

Alternative noise selection techniques can be used. For example, each client can average multiple informational messages over a designated period of time and utilize that average in selecting a noise value. This may involve use of a specified privacy bound P fixed by the client and known to the server. Assume that the client averages its informational messages over the period of a day. The client first computes its average each day. In order to force a≤P, the client computes 2 min{a, P}−1. Now the client adds noise. Assume the noise has standard deviation σ. For a single client, the average over d days has mean 2min{a,P}−1 and deviation $\sigma/\sqrt{d}$. Such an arrangement can be advantageous in that it reduces the amount of communication over the network while also improving privacy for individual informational messages.

A number of example use cases will now be described.

In a first use case, an implementation of the communication system 100 is configured to count votes made by respective ones of the clients 104. It should be noted that this system does not provide a way for voters to verify that their votes have been counted correctly, nor does it guarantee that votes will not be counted incorrectly due to the random nature of the noise added to the messages. As such, it is only an example intended to illustrate the operation of the system 100 in one application, and not as a representation of a practical voting system. Assume there are two candidates, Candidate A and Candidate B. Candidate A is represented by the message value −1, and Candidate B is represented by the value 1. Further assume that M=1,000,000 and N=10.

A given client that decides to vote for Candidate A generates the corresponding informational message −1, selects a random value from the specified range [−10,10], say 7. The client then inserts the noise by combining the message −1 with the noise 7 to obtain an anonymized message 6, and sends the message 6 to the server 102.

The server 102 receives 1,000,000 messages, one from each of the M clients. The server sums all of the messages. Assume the sum is 200,000. The server divides the 200,000 by 1,000,000, obtaining 0.2 as the result. From this information the server concludes that 40% of the clients voted for Candidate A and 60% of the clients voted for Candidate B.

In a second use case, an implementation of the communication system 100 is configured for information sharing between clients 104 acting as participants in a group of clients that communicate IOCs to server 102. A given participant may use an IOC to indicate to the server 102 that an attack has taken place without identifying itself as the particular participant that has been attacked.

As a more particular example, the participant may generate an IOC message such as "indication=−1" or "indication=1" and then randomly select a noise value from a specified range [−100,100] to be combined with the IOC message. Assume that the selected noise value is −54. The participant then generates the anonymized message by combining the informational message value 1 with the selected noise value −54 to obtain −53, and transmits the anonymized message value −53 to the server.

This anonymized message preserves the privacy of the participant that generated the message. However, the server can combine multiple such anonymized messages to extract information regarding the underlying IOCs in the manner previously described. For example, the server can sum all the values of the anonymized messages to cancel out the randomly-selected noise values, and then divide the result by the number of messages in order to obtain aggregate feedback about the IOCs.

In an arrangement of this type, the anonymized messages may be distributed to all of the group participants, so that each participant can independently determine the aggregate feedback by processing multiple anonymized messages. The server 102 in this case may be viewed as simply another group participant.

The particular processing operations and other system functionality described in conjunction with the diagrams of FIGS. 2, 3 and 4 are presented by way of illustrative example only, and should not be construed as limiting the scope of the invention in any way. Alternative embodiments can use other types of processing operations for generating anonymized messages and for extracting information from received anonymized messages.

For example, although particularly useful for anonymized feedback of IOCs, the disclosed techniques can be adapted in a straightforward manner for use with a wide variety of other types of security-related information.

Also, alternative anonymous channels or other anonymous feedback mechanisms may be used in other embodiments. Accordingly, it is to be appreciated that the particular noise insertion and removal approach based on random selection of noise values as described above is just one example of a technique for providing anonymous feedback. Other types of anonymous feedback mechanisms that may be used in embodiments of the invention include, for example, anonymous channels based on mixnets, anonymous credentials, the so-called diner's cryptographer problem, etc. However, these alternative arrangements generally include some form of coordination between the clients. For example, in an anonymous channel based on the diner's cryptographer problem, the clients may need to participate each of a plurality of timeslots and be synchronized with respect to these timeslots, or may need to utilize computationally-intensive public-key cryptography operations. The noise insertion arrangement previously described is advantageous in view of its simplicity and dynamic properties. Nonetheless, embodiments of the invention may utilize any anonymous feedback channel for group feedback of IOCs or other security-related information.

It is also to be appreciated that distributed anonymized communication functionality such as that described in conjunction with the diagrams of FIGS. 2, 3 and 4 can be implemented at least in part in the form of one or more software programs stored in memory and executed by a processor of a processing device such as a computer or server. As mentioned previously, a memory or other storage device having such program code embodied therein is an example of what is more generally referred to herein as a "computer program product." The embodiments described in conjunction with FIGS. 1-4 can provide a number of significant advantages relative to conventional practice. For example, these embodiments considerably facilitate distributed anonymized feedback of IOCs or other security-related information in a group of clients.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of communication systems, information technology infrastructure and processing device configurations, noise insertion and removal processes, and message formats. The particular process steps and component interactions used to provide distributed anonymized communications may be varied in alternative embodiments. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising the steps of:
  obtaining, by a given one of a plurality of clients, an informational message comprising security-related information;
  inserting noise in the informational message to generate an anonymized message; and
  communicating the anonymized message;
  wherein the given client is implemented on a processing device comprising a processor coupled to a memory;
  wherein the communicated anonymized message is configured to be combined with one or more other anonymized messages communicated by other ones of the plurality of clients to permit another processing device to extract from the anonymized messages collectively one or more characteristics of informational messages of the plurality of clients;
  wherein the step of inserting noise in the informational message further comprises selecting a noise value from a specified range of noise values and combining the informational message and the selected noise value to generate the anonymized message; and
  wherein the specified range of noise values is configured such that noise values in the anonymized messages from the respective clients substantially cancel one another out when the anonymized messages are combined by the other processing device, thereby allowing the other processing device to extract from the combined anonymized messages the one or more characteristics of the informational messages.

2. The method of claim 1 wherein the security-related information comprises an indication of compromise (IOC).

3. The method of claim 1 wherein the obtaining, inserting and communicating steps are performed by each of the plurality of clients on respective informational messages associated with those clients, and wherein the anonymized messages communicated by the respective clients are configured so as to prevent a receiving server from identifying any individual client associated with a particular one of the anonymized messages.

4. The method of claim 1 wherein a given one of the anonymized messages comprises a noise value randomly selected from the specified range.

5. The method of claim 1 wherein the step of selecting a noise value from a specified range of noise values comprises randomly selecting the noise value from the range.

6. The method of claim 1 wherein the step of selecting a noise value from a specified range of noise values comprises selecting the noise value from a symmetric distribution of values.

7. The method of claim 6 wherein the symmetric distribution comprises values in a specified range given by $[-N, N]$, and wherein the plurality of clients comprises M clients, where $M \gg N$.

8. The method of claim 1 wherein the informational message comprises a selected integer value of 1 or −1 and the selected noise value comprises an integer value in the specified range of noise values.

9. The method of claim 1 wherein the informational message comprises a plurality of informational messages averaged over a designated period of time.

10. The method of claim 1 wherein the step of inserting noise in the informational message comprises determining a noise value based at least in part on at least one specified bound.

11. The method of claim 1 wherein obtaining the informational message comprises averaging multiple informational messages over a designated period of time and computing the informational message based on the average and a specified privacy bound.

12. A computer program product comprising a processor-readable storage medium having encoded therein executable code of one or more software programs, wherein the one or more software programs when executed by a processing device cause the processing device to perform the steps of the method of claim 1.

13. An apparatus comprising:
a processing device comprising a processor coupled to a memory;
wherein the processing device implements a given one of a plurality of clients, the given client being operative to obtain an informational message comprising security-related information, to insert noise in the informational message to generate an anonymized message, and to communicate the anonymized message;
wherein the communicated anonymized message is configured to be combined with one or more other anonymized messages communicated by other ones of the plurality of clients to permit another processing device to extract from the anonymized messages collectively one or more characteristics of informational messages of the plurality of processing devices;
wherein the given client is operative to insert noise in the informational message by selecting a noise value from a specified range of noise values and combining the informational message and the selected noise value to generate the anonymized message; and
wherein the specified range of noise values is configured such that noise values in the anonymized messages from the respective clients substantially cancel one another out when the anonymized messages are combined by the other processing device, thereby allowing the other processing device to extract from the combined anonymized messages the one or more characteristics of the informational messages.

14. The apparatus of claim 13 wherein a given one of the anonymized messages comprises a noise value randomly selected from the specified range.

15. The apparatus of claim 13 wherein selecting a noise value from a specified range of noise values comprises selecting the noise value from a symmetric distribution of values.

16. A communication system comprising the apparatus of claim 13.

17. A method comprising the steps of:
receiving anonymized messages from respective ones of a plurality of clients, each anonymized message comprising an informational message having noise inserted therein, the informational message comprising security-related information;
combining the received anonymized messages; and
processing the combined anonymized messages collectively to extract one or more characteristics of the informational messages of the plurality of clients;
wherein the receiving, combining and processing steps are performed by a processing device comprising a processor coupled to a memory;
wherein a given one of the anonymized messages is generated by selecting a noise value from a specified range of noise values and combining the informational message and the selected noise value to generate the anonymized message; and
wherein the specified range of noise values is configured such that noise values in the anonymized messages from the respective clients substantially cancel one another out when the anonymized messages are combined by the processing device, thereby allowing the processing device to extract from the combined anonymized messages the one or more characteristics of the informational messages.

18. The method of claim 17 wherein the receiving, combining and processing steps are performed by a server that receives the anonymized messages from the respective clients.

19. The method of claim 17 wherein the step of processing the anonymized messages comprises summing the anonymized messages and dividing the result by the number of anonymized messages received in order to obtain a probability of occurrence of a particular informational value in the informational messages.

20. A computer program product comprising a processor-readable storage medium having encoded therein executable code of one or more software programs, wherein the one or more software programs when executed by a processing device cause the processing device to perform the steps of the method of claim 17.

21. An apparatus comprising:
at least one processing device comprising a processor coupled to a memory;
wherein the processing device is configured:
to receive anonymized messages from respective ones of a plurality of clients, each anonymized message comprising an informational message having noise inserted therein, the informational message comprising security-related information;
to combine the anonymized messages; and
to process the combined anonymized messages collectively to extract one or more characteristics of the informational messages of the plurality of clients;

wherein a given one of the anonymized messages is generated by selecting a noise value from a specified range of noise values and combining the informational message and the selected noise value to generate the anonymized message; and wherein the specified range of noise values is configured such that noise values in the anonymized messages from the respective clients substantially cancel one another out when the anonymized messages are combined by the processing device, thereby allowing the processing device to extract from the combined anonymized messages the one or more characteristics of the informational messages.

22. The apparatus of claim 21 wherein the processing device comprises a server that receives the anonymized messages from the respective clients.

23. The apparatus of claim 21 wherein the processing device is configured to process the anonymized messages by summing the anonymized messages and dividing the result by the number of anonymized messages received in order to obtain a probability of occurrence of a particular informational value in the informational messages.

\* \* \* \* \*